US007232371B2

(12) United States Patent
Gatto et al.

(10) Patent No.: US 7,232,371 B2
(45) Date of Patent: Jun. 19, 2007

(54) METHOD FOR CASHLESS GAMING

(75) Inventors: Jean-Marie Gatto, London (GB); Sylvie Linard, London (GB); Pierre-Jean Beney, London (GB); Thierry Brunet De Courssou, Palo Alto, CA (US)

(73) Assignee: Cyberview Technology, Inc., Palo Alto, CA (US)

( * ) Notice: Subject to any disclaimer, the term of this patent is extended or adjusted under 35 U.S.C. 154(b) by 495 days.

(21) Appl. No.: 10/826,686

(22) Filed: Apr. 15, 2004

(65) Prior Publication Data

US 2005/0233802 A1 Oct. 20, 2005

(51) Int. Cl.
*A63F 13/00* (2006.01)

(52) U.S. Cl. ............................ 463/25; 463/29; 902/23

(58) Field of Classification Search .................. 463/25, 463/29; 902/8, 23, 41
See application file for complete search history.

(56) References Cited

U.S. PATENT DOCUMENTS

| | | | | |
|---|---|---|---|---|
| 5,265,874 | A | 11/1993 | Dickinson et al. | |
| 5,290,033 | A | 3/1994 | Bittner et al. | |
| 6,048,269 | A | 4/2000 | Burns et al. | |
| 6,077,163 | A | 6/2000 | Walker et al. | |
| 6,280,328 | B1 | 8/2001 | Holch et al. | |
| 6,577,733 | B1 | 6/2003 | Charrin | |
| 6,749,510 | B2 | 6/2004 | Giobbi | |
| 6,905,411 | B2 * | 6/2005 | Nguyen et al. | 463/25 |
| 7,086,947 | B2 * | 8/2006 | Walker et al. | 463/25 |
| 2001/0012796 | A1 * | 8/2001 | Walker et al. | 463/25 |
| 2002/0147040 | A1 | 10/2002 | Walker et al. | |
| 2003/0003983 | A1 | 1/2003 | Walker et al. | |
| 2003/0162591 | A1 | 8/2003 | Nguyen et al. | |
| 2003/0211881 | A1 | 11/2003 | Walker et al. | |

FOREIGN PATENT DOCUMENTS

WO WO 01/41892 A2 6/2001

OTHER PUBLICATIONS

International Search Report mailed Dec. 18, 2006, in related International Application No. PCT/US2005/09233, filed Mar. 18, 2005 (2pgs).

Written Opinion of the International Searching Authority mailed Dec. 18, 2006, in related International Application No. PCT/US2005/09233, filed Mar. 18, 2005 (3pgs).

* cited by examiner

*Primary Examiner*—Robert E. Pezzuto
*Assistant Examiner*—Robert Mosser
(74) *Attorney, Agent, or Firm*—Young Law Firm, P.C.

(57) ABSTRACT

Methods for avoiding or reducing reliance on the need to use a physical payment instrument in substitution for cash for wagering on gaming terminals. With the method, the player uses a secure cashless payment instrument that does not require presentation of the payment instrument through an automatic reader fitted to a gaming terminal. The cashless payment instrument features a third-party security code and a two-level limited lifetime in which one level may be reset. The method may advantageously be used in small remote gaming facilities such as in island holiday resorts, in cruise ships and on-board international flights, for example.

38 Claims, 6 Drawing Sheets

METHOD FOR CASHLESS GAMING

BACKGROUND OF THE INVENTION

1. Field of the Invention

This invention relates generally to the field of pay computer-controlled games, either games of skills or games of chance, and more particularly to the field of cashless payment.

2. Copyright Notice/Permission

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright 2004, Cyberscan Technology Inc., All Rights Reserved.

3. Description of the Related Art

Cashless solutions such as ticket-in and ticket out (TITO) as described in U.S. Pat. No. 6,048,269, such as player account cashless as described in U.S. Pat. No. 6,280,328, and such as smartcard cashless as described in U.S. Pat. No. 6,577,733 each require a physical instrument (anonymous bar-coded printed ticket in the first case, a magnetic player card in the second case and an electronic wallet smartcard in the third case). In the first case (TITO), there is a requirement to fit a ticket reader as well as a ticket printer in each gaming terminal to print a ticket when the player presses the cash-out button. The printed ticket then must be presented to the cashier for cash redemption. Alternatively, the printed ticket may be inserted in another gaming terminal via a ticket reader to continue playing. Ticket printers and ticket readers, however, are complex and expensive devices that require immediate attention from trained technical staff in the case of paper jams or a malfunction. Moreover, accessing the inside of a gaming terminal requires following a strict security procedure that requires the use of special security keys and the maintenance of detailed paper logs. The requirement to have trained and trusted technical staff available permanently on site is not cost effective when considering small remote gaming facilities in island holiday resorts, cruise ships or on-board international flights.

SUMMARY OF THE INVENTION

It is, therefore, an object of this invention to provide a method that obviates the need to use a physical payment instrument as a cash substitute when a player plays on a gaming terminal. According to embodiments of the present invention, to implement embodiments of the present invention, gaming terminals need not be equipped with any electromechanical cash or cashless enabling devices for accepting such a physical instrument (apart from a manual code entry) and for delivering/updating the physical instrument (such as the printing of a ticket or updating a smartcard wallet).

It is another object of this invention to provide a method for reducing reliance on the use a physical payment instrument as a cash substitute when a player plays on a gaming terminal. To implement embodiments of the present method, the gaming terminals need not be equipped with any electromechanical cash or cashless enabling devices, except for a basic keypad entry and/or a low-cost ticket printer.

According to an embodiment, the invention includes a plurality of network connected gaming terminals that do not have any electromechanical cash or cashless enabling devices or any type of contact-less code scanner (optical, video or electromagnetic). That is, the gaming terminals, apart from having the play enabling devices such as the game display and the interactive play devices (play buttons, arm-bandit, or touch-screen, for example) need not include a coin/token acceptor, a bill acceptor, a ticket reader, a barcode reader, a magnetic card reader, a smartcard reader, a contact-less ID reader, a coin/token hopper, a note dispenser or a ticket printer. According to an embodiment of the present invention, the gaming terminals may be fitted only with a LCD display, a touch screen and loudspeakers. Using an entry computer connected to a controlling central database, a cashier typically located in a cashier cage on the gaming premises directs and monitors the cashless operations that are the subject of the present inventions. The gaming terminals and the cashier operations are controlled by a central server database via the network. The cashier or cashiers may be equipped with electromechanical cashless enabling devices such as a ticket printer and a barcode reader. In addition, network-connected stations equipped with a barcode reader capable of automatically reading a code printed on a cashless ticket and communicating with the controlling central database may be placed in areas monitored by authorized personnel.

According to one embodiment of the present invention, a player remits cash to a cashier located in a cashier cage and receives in exchange a cashless payment instrument. The cashless payment instrument may be any substitute for physical cash (notes and coins), either using a portable physical medium such as a token, a bank check, a gold ingot or an advanced technology smartcard, or alternatively a non-physical medium such as a password agreed with a trustee or a bookmaker, a memorized Swiss bank numbered account, a voice recognized by a trustee or a biometric signature. The cashless payment instrument may comprise a unique identification code that is indexed in a database on the server. For example, the cashless payment instrument may be a printed ticket delivered by the cashier and may have an identification code. A credit corresponding to the remitted cash is associated with the identification code in the database. The player may carry the cashless payment instrument with him to a game terminal and present (e.g., provide) the code to the gaming machine. After the gaming machine accepts the presented code, the cashless payment instrument will be credited with the amount corresponding to the amount maintained at the database on the server.

Given that the cashless payment instrument may be a printed ticket showing a unique code (indexed in a central database) that is readable by the player and that may be accepted by the gaming terminal via manual entry using a keypad or a touch screen (and validated by the central database via the network), the cashless payment scenario up to this stage may be thought of as equivalent to a telephone ticket obtained at a convenience store, in which a code printed on a thermal-print voucher (or ticket) is keyed-in by the user on the telephone key-pad and the central server authorizes talking time until credit is exhausted. Such a scenario is, however, deemed to be insufficiently secure for use in gaming, as a malicious person may guess the code and use-up all the credit of the unsuspecting user who purchased the voucher in the first place. Although telephone card companies have put in place some basic security procedures, such as cutting the phone line after three false entries, and denying answering when a caller ID is suspicious, this scheme would be unacceptable to game regulators.

Therefore, for additional security, the cashless payment instrument according to embodiments of the present invention may be assigned a predetermined short lifetime, as measured from the issuance of the cashless payment instrument to the player. For example, the lifetime may be as short as 5 minutes for example, during which time a gaming terminal may accept the payment instrument. A cashless payment instrument whose lifetime has expired may be reset by the cashier. For additional security, the cashless payment instrument, upon being issued to the player, may be given an additional predetermined short lifetime (2 hours for example), during which the cashier may accept redemption of the cashless payment instrument, after which authorized personnel may have to intervene to determine the reason for the expiry.

According to another embodiment, upon being issued to the player, the cashless payment instrument may be given a two-level lifetime in which the first level lifetime is a predetermined short period of time such as 5 minutes for example, during which a gaming terminal may accept the cashless payment instrument and in which the second level life time is a predetermined short period of time such as 2 hours for example, after which the cashless payment instrument is no longer valid unless presented for examination to an on-site game regulator representative or other authorized personnel.

When the first level lifetime for a cashless payment instrument has not expired and the cashless payment instrument is not being used for playing on a gaming terminal, the cashless payment instrument is said to be “alive”. When the first level lifetime for a cashless payment instrument has not expired and the cashless payment instrument is being used for playing on a gaming terminal, the cashless payment instrument is said to be “locked”. When the first level lifetime has expired and the second lifetime has not expired, the cashless payment instrument is said to be “dormant”. When the second lifetime has expired, the cashless payment instrument is said to be “dead”. When a player is playing on a gaming terminal, the second level lifetime clock may be frozen until the cash out button is pressed. When the credit balance associated with a cashless payment instrument reaches zero, the cashless payment instrument is said to be “empty”; it becomes dead and the second-level lifetime is set to the expired state.

The first level lifetime may be selected so as to allow sufficient time for the player to choose a gaming terminal on which to play, and may be selected so as to be insufficient for a malicious person to successfully mount an attack by guessing the code of an alive payment instrument. If the cashless payment instrument is dormant or dead, no gaming terminal may accept the payment instrument. Upon being accepted by a gaming terminal and until the cash-out button is pressed (if credit is not zero), the cashless payment instrument is locked and may not be accepted by another gaming terminal. Similarly, when the credit reaches zero, the associated cashless payment instrument is dead may not be accepted by another gaming terminal and may not be cashed-out at the cashier.

When a cashless payment instrument is dormant (and is not dead), it may be reset to the alive state by presenting it to a cashier to “wake it up”—that is, to bring the cashless payment instrument from the dormant to the alive state. According to one embodiment, a device capable of automatically accepting the code associated with the cashless payment instrument may be placed close to a cashier, a security officer or a game regulator representative so that the player’s face may be monitored. Such a device (hereafter called a “reactivation station”) may be a laser barcode scanner connected to the central database that emits a characteristic beep or noise when the cashless payment instrument is woken-up (or re-activated). Immediately upon recognizing a dormant cashless payment instrument via the reactivation station, the database server automatically resets the status of the dormant cashless payment instrument to alive, thus allowing the player to go and play on a gaming terminal. The fact that the player must present him or herself in person at a monitored location is believed to deter malicious people from repeatedly attempting to cheat the system. When a dormant cashless payment instrument is presented to a gaming terminal, a message displayed on the screen may indicate that the cashless payment instrument needs to be presented to a reactivation station before game play can proceed. Indeed in some gaming premises, the reactivation station may be substituted by a cashier performing the same reactivation operation.

If a cashless payment instrument becomes dead, for example after remaining dormant for a long time while the player is eating his dinner, the player must present his cashless payment instrument to a cashier to change its status back to alive. According to one embodiment of the present invention, a dead cashless payment instrument may not be resurrected back to the alive state by a reactivation station. This forces the player to present him or herself to the cashier or a game regulator representative. That the player has to show up in a place with security or game surveillance, and talk to a gaming representative, further deters repeated cheating attempts.

According to another embodiment, icons may be displayed on the cashier’s screen representing dormant and dead cashless payment instruments which have been respectively denied by gaming terminals or reactivation stations, in order to be alerted of attempts made by potentially malicious people.

When the credit associated with a cashless payment instruments is zero, the cashless payment instruments is said to be “empty”. When an empty cashless payment instrument is presented to a gaming terminal, a message displayed on the screen may indicate that the credit associated with the cashless payment instrument is depleted and that the cashless payment instrument should be discarded (in a trash receptacle, for example, in the case of a printed ticket).

When a player hits the jackpot or wishes to cash-in his or her remaining credits or winnings by pressing the cash out button, he or she presents the cashless payment instrument to the cashier who may consult the central database to obtain authorization for payment.

When a player wins a jackpot, the gaming terminal may lock-up and a special visual signal may be activated. Thereafter, the player can no longer play or activate any function and must wait for an attendant or security person to initiate a verification procedure to ensure that the gaming terminal has not been tampered with. Upon completion of the verification procedure, the player can no longer play and must be paid. In this case, the player may not need to press the cash-out button to initiate the redemption process.

According to a further embodiment, for additional security whenever cashing out large winning sums such as subsequent to a progressive jackpot in which the win amount may be in the order of 20 million dollars, at the time a player originally remits cash to the cashier to get the cashless payment instrument in exchange, the player may be prompted to enter a secret PIN or password on a keypad/ keyboard. The PIN or password is only known to the player and is stored in the central database together with the details of the cashless payment instrument and initial credit. Consequently, when the player leaves the gaming machine subsequent to a jackpot win or subsequent to pressing the cash-out button, he is confident that only he may claim the winnings by retyping his PIN number or password when presenting the cashless payment instrument to the cashier. The capability to enter a PIN may be an option given to the player or may be mandated by game regulation.

According to another embodiment, for significant additional security whenever cashing out large winning sums such as subsequent to a progressive jackpot whereby the win amount may be in the order of 20 million dollars, a third party security code (or security number) may be associated with the cashless payment instrument. For example, if the cashless payment instrument is a ticket printed on thermal paper, the code to be presented to the gaming machine is printed on the ticket by the thermal printer at the moment of issue, and the security number is preprinted on the back of the ticket with an inking process when the paper spool is made (thus the number is printed by a third party). Preferably, the security number may be printed in red such that it does not interfere with barcode scanning, laser and CCD barcode readers being blind to the color red. The security numbers may be printed frequently at regular intervals on the paper spool, for example every 10 cm, such that each printed ticket may have at least one security number readable on the back of the ticket. Security numbers may simply be unique sequential numbers printed at the back of the blank paper every 10 cm for example. In that case, no record of these numbers need be communicated to anyone. When a ticket is presented by a player for redemption of winnings or remaining credits, the cashier may systematically record the security number found on the back of the presented ticket together with other details needed for the redemption. Considering that statistically they may be one (1) ticket presented for redemption out of ten (10) tickets initially issued, there should be a recorded trace in the central database of 10% of the security numbers in a random distribution, to which may be associated the exact time at which the original ticket was issued.

Therefore, when a player presents a suspicious or a very large sum winning ticket for redemption, the cashier after entering the identification code printed on the ticket (by scanning the barcode printed on the ticket) simply keys-in the security number (or one of the security numbers) available on the back of the ticket, which security number is immediately processed at the central database. The central database recovers the exact issuing timestamp when the presented ticket was emitted, as well as the security numbers of the paid tickets that were originally issued before the presented ticket was issued (hereinafter, the "before ticket") and after the presented ticket was issued (hereinafter, the "after ticket"). If the security number of the presented ticket is within the range delimited by the security numbers of the before ticket and the after ticket, then there is a high confidence that the ticket is genuine and the payment may be authorized.

It would be extremely difficult for a malicious person to forge a winning ticket having all three parameters correct: the identification code, the issuing timestamp and the security number. Indeed, the security numbering scheme may be further hardened by having the paper spool maker print pseudo random numbers (instead of sequential numbers) that are then recorded in a central database accessible by an authorized third party. During the verification process, the central database (or the cashier) would submit the security code of the presented ticket, the security code of the before ticket and the security code of the after ticket to the third party. The third party would then look-up the series of pseudo random numbers to confirm whether the security number of the presented ticket was pre-printed between the security number of the ticket having an issuing timestamp before the presented ticket and the security number of the ticket having an issuing timestamp after the presented ticket.

DETAILED DESCRIPTION OF THE INVENTION

In the following detailed description of exemplary embodiments of the invention, reference is made to the accompanying drawings, which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Figure 1:
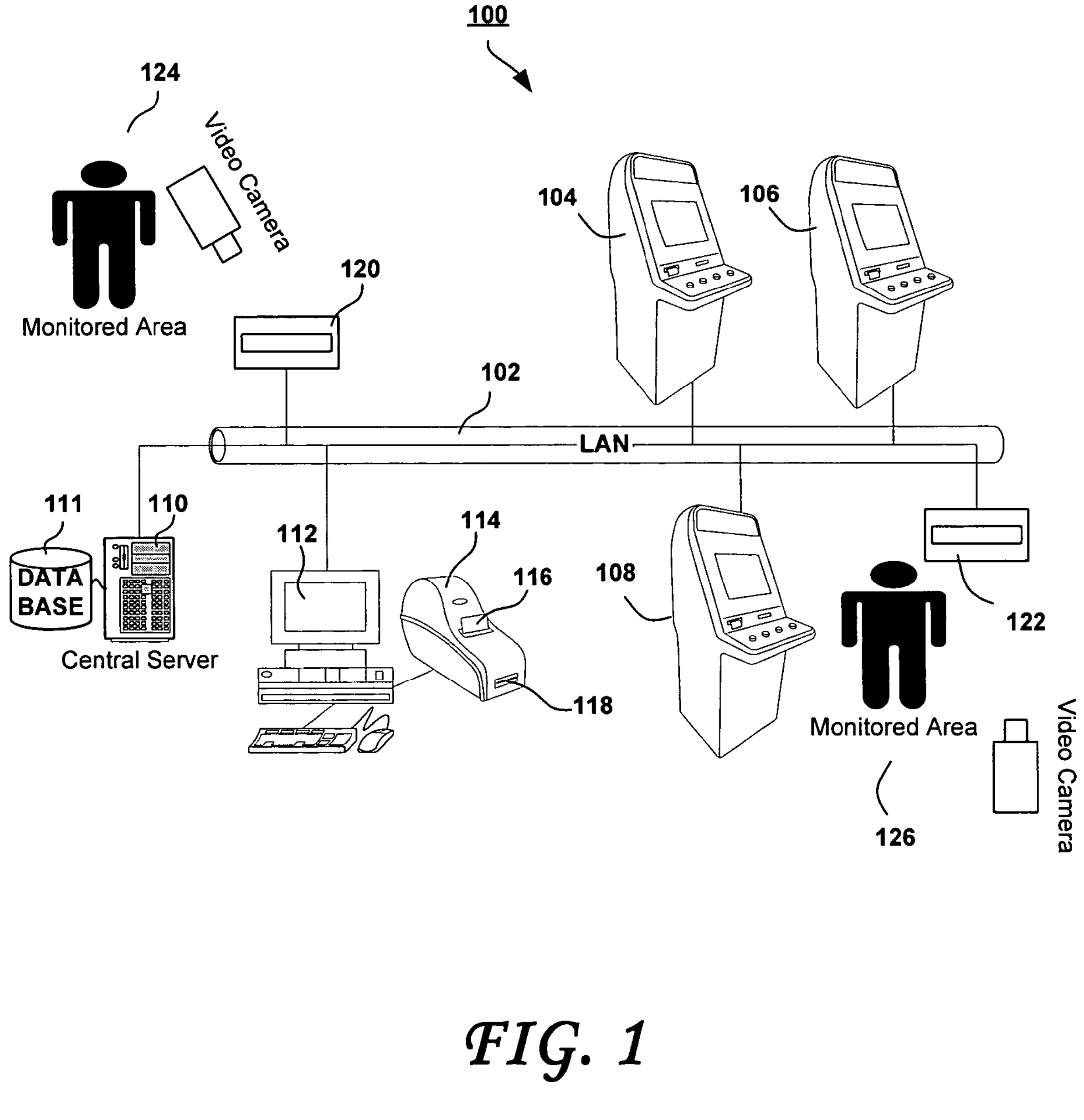
FIG. 1 shows elements of a secure cashless gaming system according to an embodiment of the present invention.

FIG. 1 illustrates elements of a system for cashless gaming, according to an embodiment of the present invention. As shown, reference numeral 100 shows a network connected gaming system comprising a plurality of gaming machines 104, 106 and 108, at least one payment verification station 112 located for example within a cashier cage, a central database 111 controlled by a central server 110 and at least one re-activation station 120, 122 located in an area monitored by gaming personnel and/or video surveillance 124, 126. The payment verification station 112 comprises a computer equipped with a printer 114 configured to print tickets 116 and a barcode scanner 118.

Figure 2:
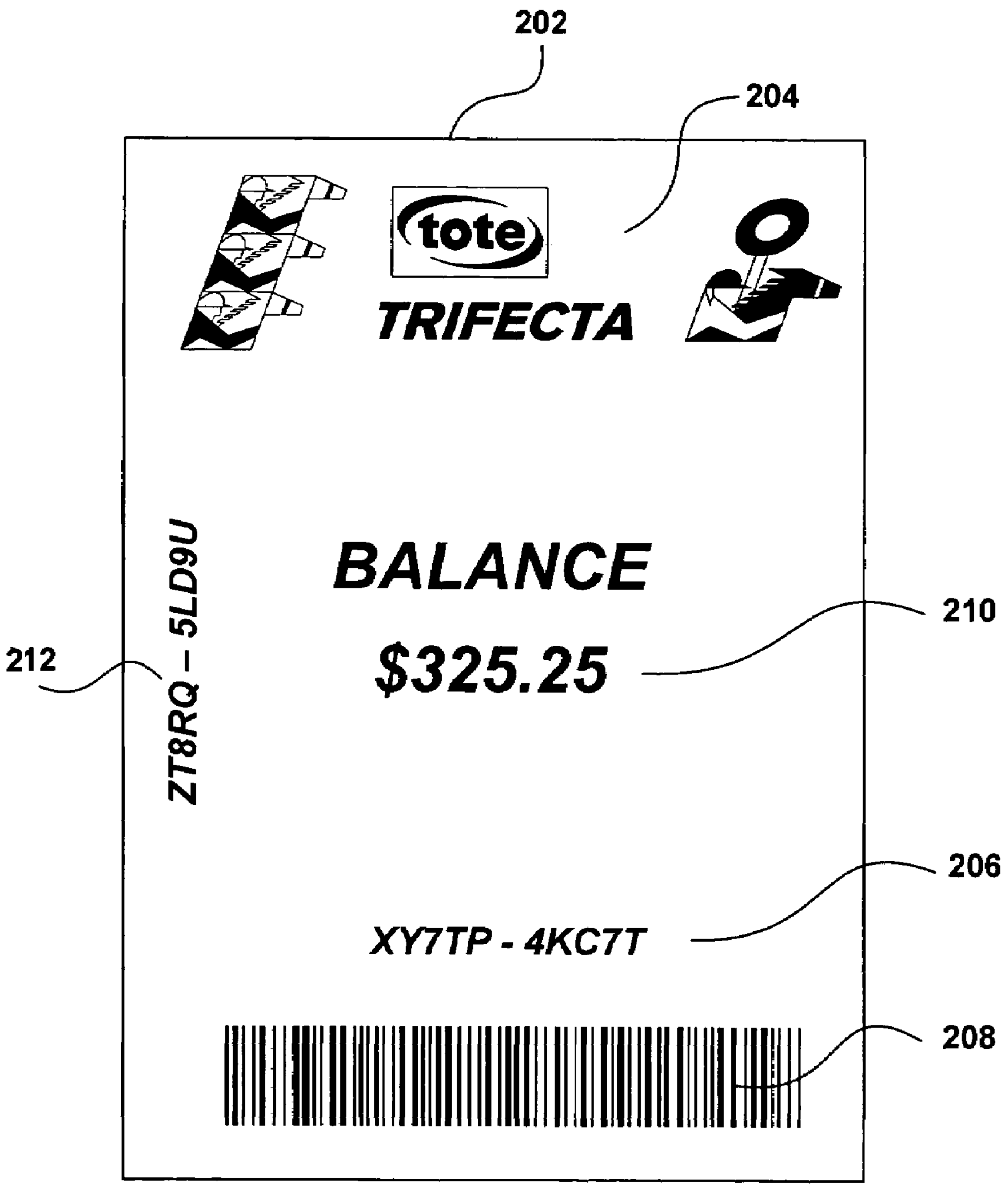
FIG. 2 shows a cashless ticket, according to an embodiment of the present invention.

FIG. 2 shows an exemplary cashless ticket according to an embodiment of the present invention. The ticket 202 may include a logo 204, an identification code 206, a barcode 208 which may or may not be identical to the identification code 206, an amount 210 corresponding for example to the cash remitted when the cashless ticket 202 was issued to the player by the cashier and a security number 212. When the barcode 208 is not identical to the identification code 206, a link or association between these two numbers may be maintained at the central database 111. The security number 212 may have been pre-printed on the edge of the cashless ticket 202 or on the back of the cashless ticket 202 when the cashless ticket blanks (e.g., a spool of such cashless ticket blanks) were made. Alternatively, the security number 212 may be printed upon issuance of the cashless ticket 202 under the control of a secure process whereby the printing of the security number 212 cannot be predicted and may be verified by a third party.

Figure 3:
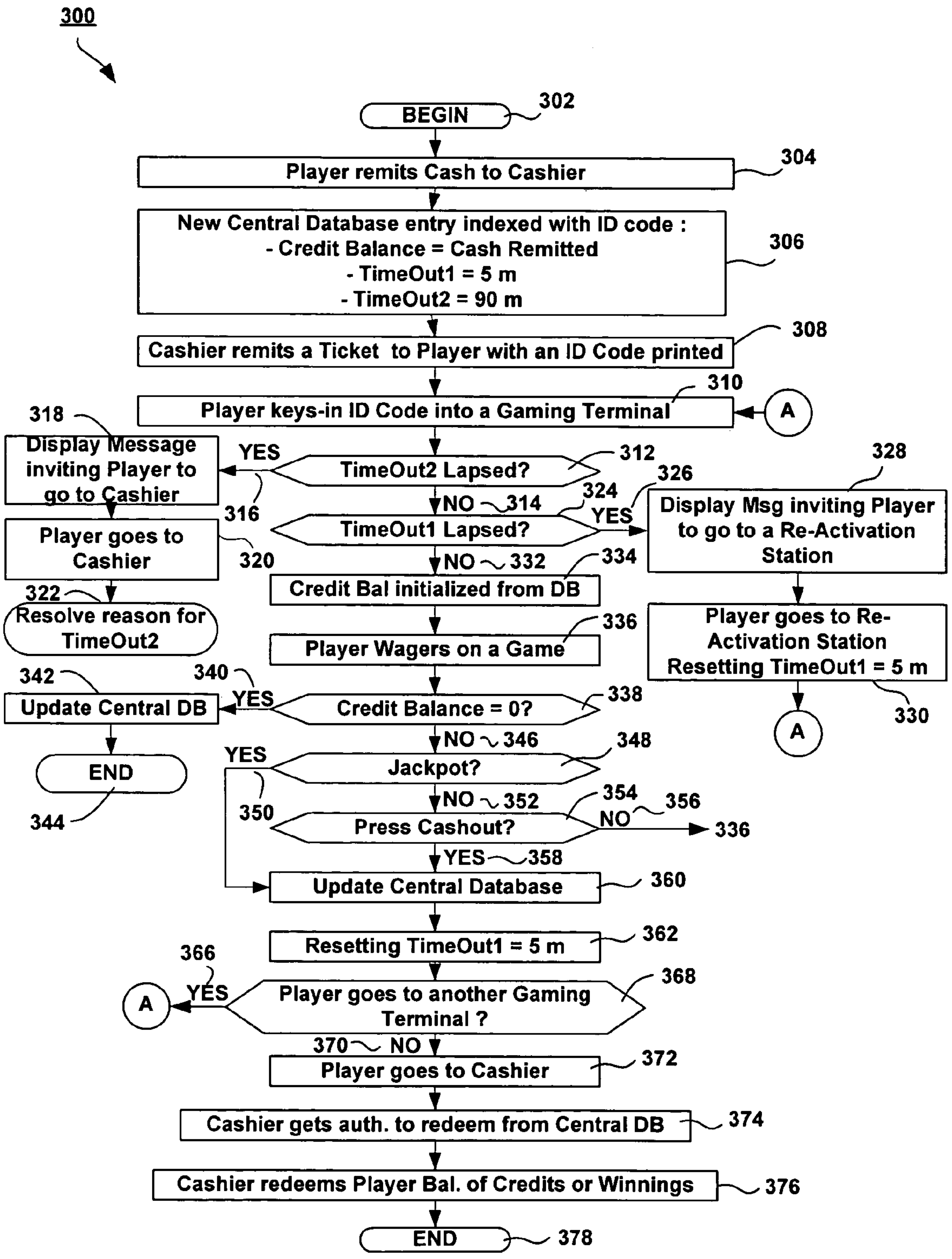
FIG. 3 shows an embodiment of the present cashless payment method, according to an embodiment of the present invention.

FIG. 3 illustrates a complete cash-in/cashless-play/cash-out cycle for a player according to a cashless procedure using a secure 2-level limited lifetime ticket method, according to an embodiment of the present invention. The cycle begins at 302 with a cash-in step in which the player remits cash to a cashier as shown at 304. The central server 110 and the database 111 create a new entry at 306 that is indexed with the ticket identification code 206 and that includes the credit balance 210 set to the amount of cash (or other form of tangible or electronic money) remitted by the player, a first timeout value set, for example, at 5 minutes and a second timeout value set, for example, at 90 minutes. The two timeouts are started (running).

Figure 4:
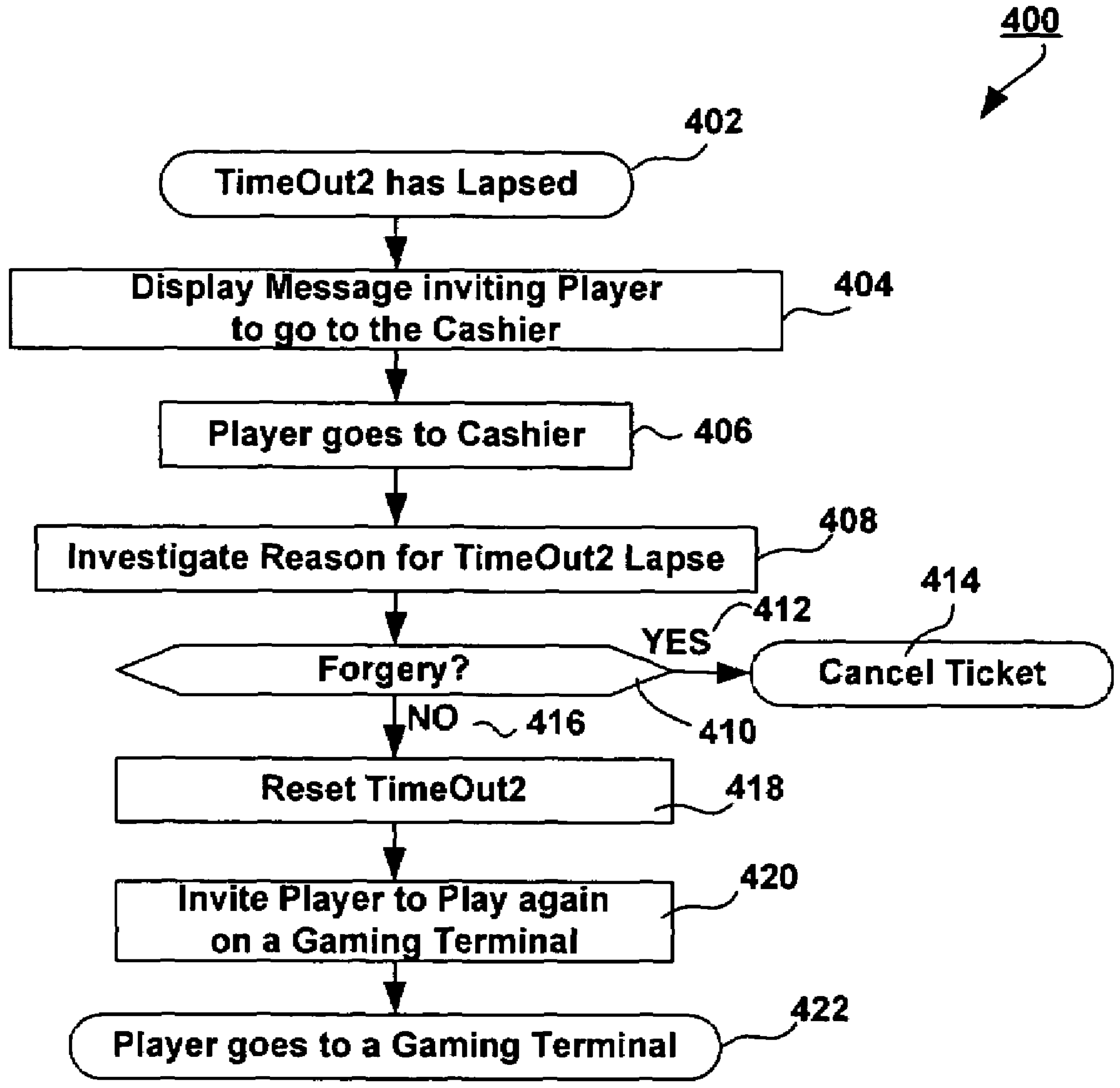
FIG. 4 shows a 2nd-level lifetime lapse, according to an embodiment of the present invention.

Step 308 calls for the cashier to remit a printed ticket (similar to that shown in FIG. 2, for example) to the player 308, the remitted cashless ticket including a readable identification code as illustrated in FIG. 2 at numeral 206. As shown at 310, the player then walks to a selected gaming terminal and enters the identification code via a touch-screen or a keypad, for example. The gaming terminal contacts the central server and database 110, 111 and recovers the data associated with the identification code 206, namely the credit balance 210, the running first timeout and the running second timeout. If the second timeout has lapsed as shown at 312, 316 then a message may be displayed informing the player that his ticket is no longer valid and inviting him, as shown at 318, to walk to the cashier 318 to sort out the issue. As called for by step 320, the player goes to the cashier where the reason for the timeout may be resolved, as shown at 322. The detailed procedure for resolving the timeout is shown at FIG. 4.

If the second timeout has not lapsed as shown at 312, 314, then the first timeout is checked. If the first timeout has lapsed as shown at 324, 326 then a message may be displayed informing the player that his ticket is no longer valid and inviting him to walk to a re-activation station to re-activate his ticket, as shown at 328. Thereafter, the player, as called for by step 330, goes the re-activation station that is monitored by gaming personnel and/or video surveillance and scans the tickets in front of the laser barcode scanner 120 or 122. If no reasons exist for not doing so, when the presented cashless ticket 202 is scanned, the first timeout is reset to its initial value as shown at 330 and the method reverts to step 310 whereupon the player goes to a selected gaming machine to key-in the identification code. Alternatively, the player may go to a cashier who may re-activate the ticket in a similar fashion as would the re-activation station.

If the first timeout has not lapsed as indicated at 324, 332, then the gaming terminal credit balance is initialized from the amount maintained in the central server and database 110, 111, as shown at 334. The player may then wager on a game, as indicated at 336. If the gaming terminal credit balance is zero as shown at 338 and 340, the central database 111 is updated at 342 and the player gaming cycle is terminated at 344. As shown at 338, 346, if the gaming terminal credit balance is not zero and if no jackpot is won at 348, 352 and if the player has not pressed the cash out button as indicated at 354, 356, then the player may wager for another game and the method may revert to step 336.

If a jackpot is won at 348, 350 or the cash out button is pressed at 354, 358, then the central database 111 is updated at 360 to reflect the current credit balance. The first timeout is reset to its initial value as shown at 362 in the central database 111. The player may chose to play on another gaming terminal as shown at 368, 366 and engage in the gaming cycle at step 310. Alternatively, the player may decide to walk to the cashier as indicated at 368, 370 and 372 to whom the ticket is presented. The central server and database 110, 111 may then authorize payment of the jackpot, which payment closes the cashless transaction. The cashier may then pay the balance of credits and/or winnings to the player at 376, which would close the cash out-out step at 378 of the cash-in/play/cash-out cycle.

According to another embodiment, whenever the gaming terminal is equipped with a low cost ticket printer such as found at supermarket cash registers, a cash-out ticket may be printed upon pressing the cash-out button or upon winning the jackpot. The ticket may be identical to the initially remitted ticket as shown at FIG. 2 except for the credit balance and other miscellaneous information, such as the time the ticket is printed. The identification code is unchanged. The credit balance shown on the ticket printed by the gaming terminal is simply information to the player. Only the identification code which is shown both on the originally remitted ticket and the cash-out/jackpot ticket is required to be given for other subsequent steps such as redemption or playing remaining credits on another gaming terminal. In a similar fashion, upon the credit balance reaching zero, an identical ticket may be printed by the gaming terminal showing a zero credit balance for information to the player.

FIG. 4 shows at 400 a method for resolving a 2nd-level lifetime timeout, according to an embodiment of the present invention. FIG. 4 illustrates the procedure associated with the resurrection (e.g., change of status to the alive state) of a lapsed (or dead) second level lifetime associated with a cashless ticket. When the second timeout has lapsed as indicated at 312 (FIG. 3) and reference numeral 402 in FIG. 4, a message may be displayed informing the player that his ticket is no longer valid and inviting him to walk to the cashier as indicated at 404 to resolve the issue. At step 408, the player goes to the cashier where the possibility of a forgery is examined at step 410. If forgery is suspected or established at 412, the case may be transferred to the game regulator representative, the ticket is cancelled at 414 and the central server and database 110, 111 is updated accordingly. If no forgery is suspected at step 416, the second timeout is reset to its initial value at 418 or alternatively set to a predetermined value and the central server and database 110, 111 is updated accordingly. The player is invited to play again on a gaming terminal, as shown at 420. The player may then walk to a gaming terminal of his choice as shown at step 422.

Figure 5:
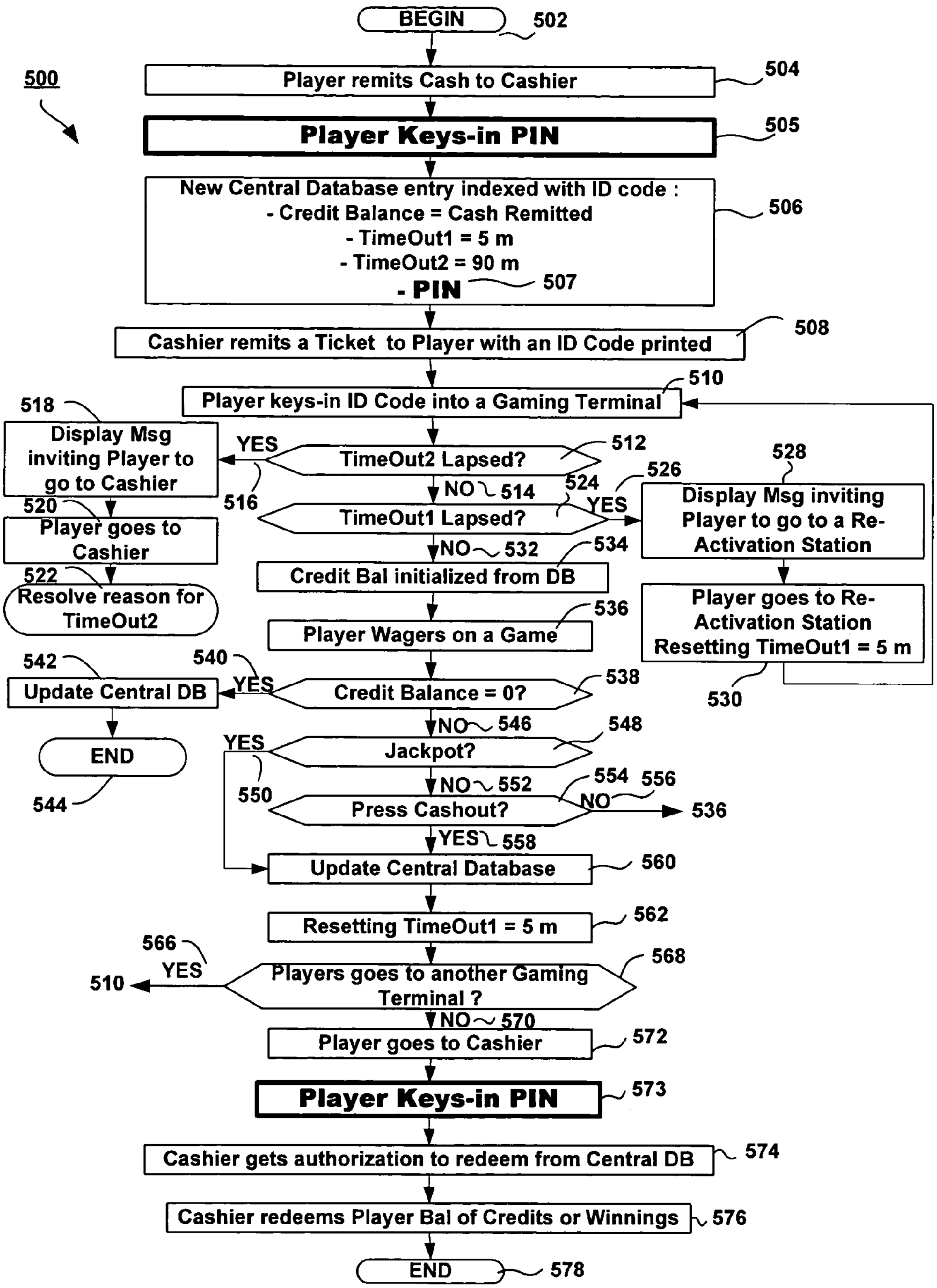
FIG. 5 shows another embodiment of the present cashless payment method, according to an embodiment of the present invention.

FIG. 5 shows at 500 a cash-in/cashless-play/cash-out cycle with a player PIN, according to an embodiment of the present invention. FIG. 5 illustrates a complete cash-in/cashless-play/cash-out cycle for a player using the secure 2-level limited lifetime ticket method described relative to FIG. 3, supplemented with the use of a player entered secret PIN for additional security. Diagram 500 is identical to diagram 300 in FIG. 3 except for the steps noted in bold and with thicker line boxes, as shown at 505, 507 and 573. For clarity, only these modified steps are detailed hereunder.

According to an embodiment of the present invention, for additional security when a player cashes out large winning sums such as subsequent to a progressive jackpot in which the win amount may be in the order of 20 million dollars, when the player originally remits cash to the cashier to obtain the cashless payment instrument in exchange, the player may enter a secret PIN 505 or password on a keypad/keyboard (or using any other suitable and secure input means). The PIN or password is only known to the player and is stored in the central database 111 together with the cashless payment instrument details and initial credit, as shown at 507. Consequently, when the player leaves the gaming machine subsequent to a jackpot win or subsequent to pressing the cash-out button, in order to claim his winnings at the cashier cage, he may be confident that only he may claim the winnings by retyping (or otherwise re-entering) his PIN number or password as shown at 673 when presenting the cashless payment instrument to the cashier. The capability to enter a PIN may be an option given to the player or be imposed by the prevailing game regulation.

Figure 6:
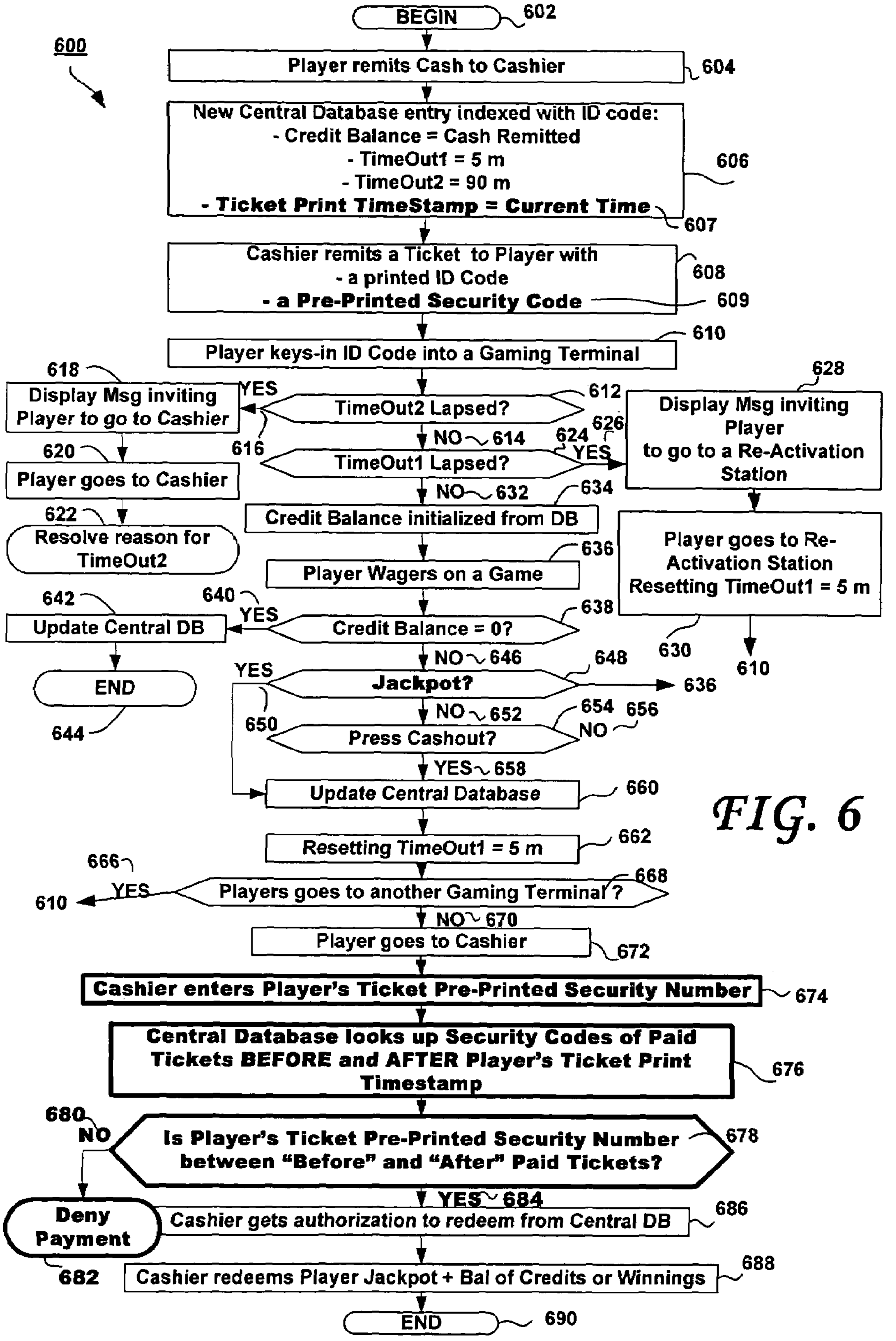
FIG. 6 shows yet another embodiment of the present cashless payment method, according to an embodiment of the present invention.

FIG. 6 illustrates a complete cash-in/cashless-play/cash-out cycle for a player according to a cashless procedure using the secure 2-level limited lifetime ticket method described relative to FIG. 3, supplemented with the use of a pre-printed security number for significant additional security. Diagram 600 is identical to diagram 300 shown in FIG. 3 except for the steps in bold and the thicker line boxes shown at 607, 609, 674, 676, 678, 680, 682 and 684. For clarity, only these modified steps are detailed hereunder. According to this embodiment, for significant additional security whenever cashing out large winning sums such as subsequent to a progressive jackpot, as shown at 648 in which the win amount may be in the order of 20 million dollars, a third party security number (or security number or validation number) may be associated with the cashless payment instrument. For example, if the cashless payment instrument is a ticket printed on thermal paper, the identification code to be presented to the gaming machine may be printed on the ticket by the thermal printer at the moment of issue as shown at 608, and the security number may be preprinted on the back of the ticket as shown at 609 with an inking process when the paper spool is made (thus the number is chosen/printed by a third party). Preferably, the security number may be printed in red such that it does not interfere with barcode scanning, as laser and CCD barcode readers are blind to the color red. The security numbers may be printed frequently at regular intervals, for example every 10 cm on the spool, such that each printed ticket may have at least one security number readable on its backside. Security numbers may simply be unique sequential numbers printed on the back of the blank cashless ticket every 10 cm (for example). In that case, no record of these numbers need be communicated to anyone.

When a ticket is issued, a timestamp may be being recorded in the central database 111, as shown at 607, together with other information associated with the issue of the ticket.

When a ticket is presented by a player for redemption of winnings or remaining credits, then the cashier systematically records the security number found on the back of the cashless ticket, as shown at 674, together with any other details needed for the redemption. Considering that statistically they may be one (1) ticket presented for redemption out of ten (10) tickets initially issued, there is a recorded trace in the central database of 10% of the security numbers in a random distribution, to which is associated the exact time the original ticket was issued.

Therefore, when a player presents a suspicious or a very large sum winning ticket for redemption, the cashier after entering the identification code printed on the ticket (by scanning the barcode or other machine printed on the ticket) simply keys-in the security number (or one of the security numbers) 674 available on the back of the ticket, which cashless ticket is immediately processed at the central database 111. At numeral 676 678, the central database 111 recovers the exact issuing timestamp when the presented ticket was issued, and then retrieves the security numbers of the paid tickets that were originally issued before and after the presented ticket was issued. If the security number of the presented ticket is within the range delimited by the security numbers of the before ticket and the after ticket, then there is a high confidence that the ticket is genuine and the payment may be authorized, as shown at 684 and 686. Otherwise, payment is denied as shown at 680, 682.

It would be extremely difficult for a malicious person to forge a winning ticket having all three parameters correct: the identification code 206, the issuing timestamp 607 and the security number 212. Indeed, the security numbering scheme may be further hardened by having the paper spool maker print pseudo random numbers (instead of sequential numbers) which may be recorded in a central database 111 accessible by an authorized third party. During the verification process, the central database 111 (or the cashier) would submit the security number 212 of the presented ticket, the security number of the before ticket and the security number of the after ticket to the third party. The third party would then look-up the series of pseudo random numbers to confirm whether the security number of the presented ticket was pre-printed between the security number of the ticket having, an issuing timestamp before the presented ticket and the security number of the ticket having an issuing timestamp after the presented ticket.

The cashless method described herein is simple yet sufficiently secure so as to be accepted by game regulators in small to medium size gaming operations, such as island holiday resorts, in cruise ships and on-board international flights in which having a player walk to a cashier or a re-activation station monitored by gaming personnel and/or video surveillance is acceptable.

If the identification code 206 is a password or pass phrase entered or submitted by the player, the need to print a ticket may be totally unnecessary, as the player may simply manually enter the password or pass phrase (or provide same by other means) each time he or she wishes to play on a gaming machine. This totally medium-free cashless method may be popular on board cruise ship, whereby during his several days journey a player may play at any time on any gaming machine on board the ship without having to carry cash or a ticket, especially in places in which carrying a ticket is inconvenient or prone to stealing such as at the swimming pool or at the gym.

Although specific embodiments have been illustrated and described herein, it will be appreciated by those of skill in the art that any arrangement that is calculated to achieve the same purpose may be substituted for the specific embodiments shown. This application is intended to cover any adaptations or variations of the present invention.

What is claimed is:

1. A cashless payment method for a network connected gaming system, comprising the steps of:

issuing a two-level limited lifetime payment instrument in exchange for money remitted by a player, the payment instrument including an identification code indexed in a central database in which data associated with the identification code is stored, the data comprising at least a first level lifetime of the payment instrument being set to a first timeout, a second level lifetime of the payment instrument being set to a second timeout, and a balance of credit being set to the money remitted;

accepting the payment instrument by a gaming terminal of the gaming system selected by the player;

determining from the accepted payment instrument whether the first level lifetime has lapsed, and if the first level lifetime is determined not to have lapsed, carrying out steps of crediting the gaming terminal with a credit amount corresponding to the balance of credit; enabling wagering on the gaming terminal and updating the credit amount while a balance of the credit amount is greater than zero, and whenever the balance of the credit amount is zero, disallowing further wagering and redeeming, and resetting the first level lifetime;

if the first level lifetime is determined to have lapsed, carrying out steps of prompting the player to present the issued payment instrument to a re-activation station; resetting the first level lifetime to the first timeout at the reactivation station upon presentation of the issued payment instrument, and prompting the player to present the issued payment instrument to the selected gaming terminal of the gaming system, and enabling redemption of the balance of the credit amount when the player has won a jackpot or has pressed a cash out button on the gaming terminal and has a non-zero balance of the credit amount.

2. A method according to claim 1, wherein the accepting step includes a step of providing the selected gaming terminal with the identification code of the issued payment instrument.

3. A method according to claim 1, wherein the selected gaming terminal is equipped with at least one of a keyboard/keypad and a pointing device and wherein the accepting step includes a step of accepting manual entry of the identification code of the issued payment instrument via the at least one of the keyboard/keypad and the pointing device.

4. A method according to claim 1, wherein the identification code includes at least one of an alphanumeric code, a password and a pass-phrase.

5. A method according to claim 1, further comprising the step of monitoring the re-activation station by at least one of authorized personnel and video surveillance.

6. A method according to claim 1, wherein the re-activation station is an automated unattended device or a device operated by a cashier.

7. A method according to claim 1, wherein the redemption enabling step is rejected if the second lifetime has lapsed.

8. A method according to claim 7, wherein when the redemption enabling step is rejected, and if forgery is established, further carrying out a step of canceling the issued payment instrument.

9. A method according to claim 1, wherein the first lifetime is set to a lapsed state if the second lifetime has lapsed.

10. A method according to claim 1, wherein the player winning the jackpot or pressing the cash out button step results in having a cash-out payment instrument issued, and the payment instrument in the redemption enabling step is the cash-out payment instrument.

11. A method according to claim 1, wherein the accepting step includes a step of acquiring the identification code of the issued payment instrument by voice recognition of the player.

12. A method according to claim 1, wherein the accepting step includes a step of acquiring the identification code of the issued payment instrument and identification of the player by utilizing a biometric recognition device.

13. A method according to claim 1, wherein the identification code is at least one of an alphanumeric code, a password, pass-phrase and a voiceprint that is pronounced by the player and acquired by a voice recognition device fitted to the selected gaming terminal.

14. A method according to claim 1, wherein the issuing step further comprises a step of keying a first PIN by the player, the first PIN being recorded in the central database and wherein the redemption enabling step further comprises a step of keying a second PIN by the player, and denying the redemption enabling step if second PIN does not match the first PIN recorded in the central database.

15. A cashless payment method for a network connected gaming system, comprising the steps of:

issuing a two-level limited lifetime ticket in exchange for money remitted by a player, the ticket including a printed identification code indexed in a central database in which data associated with the identification code is recorded, the data comprising at least a first level lifetime of the ticket being set to a first timeout, a second level lifetime of the ticket being set to a second timeout and a balance of credit being set to the money remitted;

accepting the ticket by a gaming terminal of the gaming system selected by the player and crediting the gaming terminal with a credit amount corresponding to the balance of credit;

determining from the accepted ticket whether the first level lifetime has lapsed, and if the first level lifetime is determined to have lapsed, carrying out steps of prompting the player to present the issued ticket to a re-activation station, resetting the first level lifetime to the first timeout at the reactivation station upon presentation of the issued ticket and prompting the player to present the issued ticket to the selected gaming terminal or another gaming terminal of the gaming system, and if the first level lifetime is determined not to have lapsed and a balance of the credit amount is greater than zero, carrying out steps of enabling wagering on the selected gaming terminal or on another gaming terminal of the gaming system, updating the credit amount and enabling redemption of the balance of the credit amount when the player has won a jackpot or has pressed a cash out button on the gaming terminal upon presentation by the player of the ticket, and if the balance of the credit amount is zero, disallowing further wagering and redemption.

16. A method according to claim 15, wherein the selected gaming terminal is equipped with at least one of a keyboard/keypad and a pointing device.

17. A method according to claim 16, wherein the accepting step includes a step of accepting manual entry of the identification code via at least one of the keyboard/keypad and the pointing device.

18. A method according to claim 15, wherein the identification code includes at least one of an alphanumeric code, a password and a pass-phrase.

19. A method according to claim 15, further comprising the step of monitoring the re-activation station by at least one of authorized personnel and video surveillance.

20. A method according to claim 15, wherein the re-activation station may be an automated unattended device or a device operated by a cashier.

21. A method according to claim 15, wherein the redemption enabling step is rejected if the second lifetime has lapsed.

22. A method according to claim 21, wherein when the redemption enabling step is rejected, and if forgery is established, further carrying out a step of canceling the issued ticket.

23. A method according to claim 15, wherein the first lifetime is set to a lapsed state if the second lifetime has lapsed.

24. A method according to claim 15, wherein the player winning the jackpot or pressing the cash out button step results in having a cash-out ticket printed, and the ticket of the redeeming step is the cash-out ticket.

25. A method according to claim 15, wherein the issuing step further comprises a step of keying a first PIN by the player, the first PIN being recorded in the central database and wherein the redemption enabling step further comprises a step of keying a second PIN by the player, and denying the redemption enabling step if second PIN does not match the first PIN recorded in the central database.

26. A cashless payment method for a network connected gaming system, comprising the steps of:

issuing a two-level limited lifetime ticket in exchange for money remitted by a player, the ticket including a preprinted security number and a printed identification code indexed in a central database in which data associated with the identification code is stored, the data comprising at least a first level lifetime of the ticket set to a first timeout, a second level lifetime of the ticket set to a second timeout, the timestamp of the time when the ticket is issued and a balance of credit being set to the money remitted;

accepting the ticket by a gaming terminal of the gaming system selected by the player and crediting the gaming terminal with a credit amount corresponding to the balance of credit;

determining from the accepted ticket whether the first level lifetime has lapsed and if the first level lifetime has lapsed, carrying out steps of prompting the player to present the issued ticket to a re-activation station, resetting the first level lifetime to the first timeout at the reactivation station upon presentation of the issued ticket, prompting the player to present the issued ticket to the selected gaming terminal or to another gaming terminal of the gaming system, if the first level lifetime has not lapsed, carrying out steps of enabling wagering on the selected gaming terminal or another gaming terminal of the gaming system and updating the credit balance while a balance of the credit amount is greater than zero and enabling redemption of the balance of the credit amount when the player has won a jackpot or has pressed a cash out button on the gaming terminal upon presentation by the player of the ticket, and whenever the balance of the credit amount is zero, disallowing further wagering and redeeming.

27. A method according to claim 26, wherein the selected gaming terminal is equipped with at least one of a keyboard/keypad and a pointing device.

28. A method according to claim 27, wherein the accepting step includes a step of accepting a manual entry of the identification code via the at least one of the keyboard/keypad and the pointing device.

29. A method according to claim 26, wherein the identification code includes at least one of an alphanumeric code, a password and a pass-phrase.

30. A method according to claim 26, further comprising the step of monitoring the re-activation station by at least one of authorized personnel and video surveillance.

31. A method according to claim 26, wherein the re-activation station may be an automated unattended device or a device operated by a cashier.

32. A method according to claim 26, wherein the redemption enabling step is rejected if the second lifetime has lapsed.

33. A method according to claim 32, wherein when the redemption enabling step is rejected, and if forgery is established, further carrying out a step of canceling the issued ticket.

34. A method according to claim 26, wherein the first lifetime is set to the lapsed state if the second lifetime has lapsed.

35. A method according to claim 26, wherein the player winning the jackpot or pressing the cash out button step results in having a cash-out ticket printed, and the ticket of the redemption enabling step is the cash-out ticket.

36. A method according to claim 26, wherein the issuing step further comprises a step of keying a first PIN by the player, the first PIN being recorded in the central database and wherein the redemption enabling step further comprises a step of keying a second PIN by the player, and denying the redemption enabling step if second PIN does not match the first PIN recorded in the central database.

37. A method according to claim 26, wherein the preprinted security number is from a series of sequential numbers or from a series of pseudo-random numbers.

38. A method according to claim 26, wherein the redemption enabling step is rejected if the presented ticket does not have a security code preprinted thereon that falls within a predetermined series of codes determined from the issue timestamps and the security codes preprinted on previously redeemed tickets.

* * * * *